Patented Dec. 13, 1932

1,890,917

UNITED STATES PATENT OFFICE

WALDO L. SEMON, OF SILVER LAKE VILLAGE, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing. Application filed May 16, 1932. Serial No. 611,643.

This invention relates to the art of preserving rubber, either in a vulcanized or unvulcanized condition, and to rubber compositions so preserved.

It has heretofore been known that the deterioration which rubber normally undergoes, especially when exposed to light, heat or air, can be retarded by treating the rubber with certain organic substances generally known as anti-oxidants or age-resisters. The chief object of this invention, then, is to provide a new and very effective class of such anti-oxidants or age-resisters.

This invention, in brief, consists in treating rubber or rubber compositions with the products of the condensation of diarylamines with aldehydes containing at least two and preferably more than two carbon atoms. When aldehydes of low molecular weight, such as acetaldehyde, are employed, the condensation should be carried out in the presence of an acid such as a non-oxidizing mineral acid, since the aldehyde and the amine otherwise tend to form products of little or no anti-oxidant power. The presence of acid is not necessary if higher aldehydes are employed in the reaction, but will frequently be preferred because the acid changes the course of the reaction and produces products of a different character and frequently of a higher activity than those obtained without the use of acid.

For example, such typical diarylamines as diphenylamine, ditolylamine (either ortho, meta, or para), dixylylamine, dicumylamine, phenyl-toluidine, phenyl-cumidine, phenyl-naphthylamine (either alpha or beta), tolyl-naphthylamine, dinaphthylamine, phenyl-amino-biphenyl, naphthylamino-biphenyl, phenylamino-tetraphenylmethane, phenylamino-indane, etc. may be reacted with any aliphatic aldehyde containing at least two carbon atoms, such as acetaldehyde, propionaldehyde, butyraldehyde, valeraldehyde, capronaldehyde, heptaldehyde, octaldehyde, glycollic aldehyde, acetaldol, propionaldol, butyraldol, acrolein, crotonaldehyde, alpha-ethyl beta-methyl acrolein, alpha-ethyl beta-propyl acrolein, etc. to give products which are excellent anti-oxidants or age-resisters.

Inasmuch as alkoxy substituted diarylamines are very similar in all their properties to the simple alkyl substituted compounds, the broad scope of this invention includes the reaction products of the aldehydes described above with such alkoxy diarylamines as methoxy diphenylamine, dimethoxy diphenylamine, methoxy phenyl naphthylamine, etc., as well as corresponding ethoxy, propoxy, butoxy, and other like compounds. The condensation reaction takes place with the elimination of water, the products generally being substantially free from oxygen.

The exact character of the products is dependent on the nature of the diarylamine and aldehyde selected, on the proportions of the reacting materials, and on the conditions of the reaction, but in general the products are mixtures of several substances of comparatively high molecular weight, and are therefore oily or resinous masses difficult to resolve into pure components. The resinous mixtures, however, are readily incorporated into rubber and exhibit a high degree of anti-oxidant activity, hence a separation and purification of the components of the mixtures is not ordinarily necessary.

The products of this invention do not appreciably affect the rate of vulcanization of rubber, hence they may be freely added to existing rubber compositions without necessitating any change in the time or temperature of vulcanization.

As a specific example of one embodiment of this invention 36 parts by weight of butyraldehyde are added to 85 parts of diphenylamine in 60 parts of acetone containing about 1 part of concentrated hydrochloric acid. The temperature of the mixture rises rapidly indicating the exothermal nature of the reaction. After about two hours the mixture is fractionally distilled, the first fraction, containing the acetone, and the residue being discarded. The bulk of the product distils at about 171° C. at a pressure of 2½ mm. of mercury, and is the substantially pure reaction product of equimolecular proportions of the aldehyde and the amine.

The product prepared as described above may be incorporated into any vulcanizable rubber composition before its vulcanization, preferably in the proportions of from 0.1% to 5% of the rubber in the composition, with good effect on its rate of deterioration. For example, ½% of this product added to a typical tire tread composition consisting of rubber mixed with reenforcing pigments, sulphur, and an active organic accelerator such as hexamethylene tetramine, diphenyl guanidine, or mercaptobenzothiazole, and then vulcanized, causes it to decrease in tensile strength only about half as rapidly as the composition without any age-resister.

As another example, 35 parts by weight of crotonaldehyde are added to 338 parts of diphenylamine in about 500 parts of alcohol containing 5 parts of concentrated hydrochloric acid. The mixture is refluxed for two hours, then the alcohol and the unreacted diphenylamine, amounting to about two-thirds of that originally added, are distilled off. The residue may be neutralized by treatment with an aqueous alkaline solution. It is an excellent anti-oxidant or age-resistor for rubber.

In another example, 126 parts by weight of alpha-ethyl beta-propyl acrolein are added to 169 parts of diphenylamine containing about 4 parts of concentrated hydrochloric acid. The mixture is heated gradually to 200° C. which temperature is maintained for about an hour. Considerable water splits out during the early part of the reaction. The unreacted materials, amounting to about half the mixture, are then distilled off and if desired added to the next batch prepared. The residue is an excellent anti-oxidant.

Other similar products may be prepared by changing the proportions of aldehyde and of amine undergoing the reaction, by omitting the acid catalyst or substituting some other catalyst therefor, by employing any of the other aldehydes or diarylamines within the boundaries of this invention, or by changing the conditions of the reaction. However, the reaction should always be carried out at a temperature high enough to assure the elimination of water, and preferably to split off all the oxygen of the aldehyde as water and produce a substantially oxygen-free product. A temperature of about 100° C. is frequently sufficient, but a higher temperature will generally be employed to distil off unreacted raw materials or for other reasons.

It is to be understood that the effects of the new class of anti-oxidants in retarding the deterioration of rubber may be attained in many different ways. The anti-oxidants may be incorporated into the unvulcanized rubber either by addition to the rubber latex before its coagulation, in finely dispersed form, or they may be mixed into solid unvulcanized rubber, which may then be preserved either in its unvulcanized or in a vulcanized condition, or the anti-oxidants may be applied to the surface of unvulcanized or vulcanized rubber, as in solution or suspension or in powdered form. The term "treating" is therefore employed in the appended claims in a generic sense to embrace all such methods and their equivalents.

The term "rubber" is likewise employed in the claims in a generic sense to include caoutchouc, balata, gutta-percha, reclaimed rubber, rubber isomers, synthetic rubber, and like products, whether or not admixed with fillers, pigments, vulcanizing and accelerating agents. The term "aryl" is employed in its usual sense to refer to monovalent aromatic hydrocarbon groups attached to the remainder of the molecule by a direct bond to the aromatic nucleus.

This aplication is a continuation in part of my co-pending application, Serial No. 301,438, filed August 22, 1928.

It is not my intention to limit myself wholly to the specific embodiments described herein, for many modifications are possible without exceeding the spirit and scope of the invention, but I intend to limit myself only as may be required by the prior art and as indicated in the appended claims.

I claim:

1. The method of preserving rubber which comprises treating rubber with the product of the condensation of a substance selected from the group consisting of diarylamines and alkoxy substituted diarylamines with an aliphatic aldehyde containing more than two carbon atoms.

2. The method of preserving rubber which comprises treating rubber with the product of the condensation of a substance selected from the group consisting of diarylamines and alkoxy substituted diarylamines with an aliphatic aldehyde containing at least two carbon atoms, prepared in the presence of an acid.

3. The method of preserving rubber which comprises treating rubber with the product of the condensation of a diarylamine and an aliphatic aldehyde containing more than two carbon atoms.

4. The method of preserving rubber which comprises treating rubber with the product of the condensation of a diarylamine and an aliphatic aldehyde containing at least two carbon atoms, prepared in the presence of an acid.

5. The method of preserving rubber which comprises treating rubber with the product of the condensation of a diarylamine selected from the group consisting of diphenylamine and its homologues and an aliphatic aldehyde containing more than two carbon atoms.

6. The method of preserving rubber which comprises treating rubber with the substantially oxygen-free product of the condensation of a diarylamine and an aliphatic aldehyde containing more than two carbon atoms.

7. The method of preserving rubber which comprises treating rubber with the product of the condensation of a diarylamine and an unsaturated aliphatic aldehyde.

8. The method of preserving rubber which comprises treating rubber with the product of the condensation of a diarylamine and an alpha, beta disubstituted acrolein.

9. The method of preserving rubber which comprises treating rubber with the product of the condensation of diphenylamine and an aliphatic aldehyde containing more than two carbon atoms.

10. The method of preserving rubber which comprises treating rubber with the product of the condensation of diphenylamine and an unsaturated aliphatic aldehyde.

11. The method of preserving rubber which comprises treating rubber with the product of the condensation of diphenylamine and an alkyl substituted acrolein.

12. The method of preserving rubber which comprises treating rubber with the product of the condensation of diphenylamine and alpha-ethyl beta-propyl acrolein.

13. The method of preserving rubber which comprises treating rubber with the substantially oxygen-free product of the condensation of diphenylamine and alpha-ethyl beta-propyl acrolein, prepared in the presence of an acid.

14. The method of preserving rubber which comprises treating rubber with the product of the condensation of a diarylamine and a saturated aliphatic aldehyde containing more than two carbon atoms.

15. The method of preserving rubber which comprises treating rubber with the product of the condensation of diphenylamine and butyraldehyde, prepared in the presence of an acid.

16. A composition comprising rubber and the product of the condensation of a substance selected from the group consisting of diarylamines and alkoxy substituted diarylamines with an aliphatic aldehyde containing more than two carbon atoms.

17. A composition comprising rubber and the product of the condensation of a diarylamine selected from the group consisting of diphenylamine and its homologues and an unsaturated aliphatic aldehyde.

18. A composition comprising rubber and the product of the condensation of diphenylamine and alpha-ethyl beta-propyl acrolein.

19. A vulcanized rubber composition which has been vulcanized in the presence of the product of the condensation of a diarylamine and an aliphatic aldehyde containing more than two carbon atoms, prepared in the presence of an acid.

20. A vulcanized rubber composition which has been vulcanized in the presence of the product of the condensation of diphenylamine and an alkyl substituted acrolein.

In witness whereof I have hereunto set my hand this 12th day of May, 1932.

WALDO L. SEMON.